United States Patent [19]

Fujiyama

[11] Patent Number: 4,532,172

[45] Date of Patent: Jul. 30, 1985

[54] LEADER OR TRAILER TAPE

[75] Inventor: Masaaki Fujiyama, Odawara, Japan

[73] Assignee: Fuji Photo Film Co., Ltd., Minami-Ashigara, Japan

[21] Appl. No.: 62,999

[22] Filed: Aug. 2, 1979

[30] Foreign Application Priority Data

Aug. 2, 1978 [JP] Japan .................. 53-93567

[51] Int. Cl.³ .......................... B32B 5/16; G11B 5/78
[52] U.S. Cl. .................................... 428/212; 428/336; 428/480; 428/483; 428/522; 428/409; 428/692; 428/900; 428/695; 427/128
[58] Field of Search .............. 428/900, 409, 212, 692, 428/694, 695; 360/134

[56] References Cited

U.S. PATENT DOCUMENTS

| | | | |
|---|---|---|---|
| 3,817,785 | 6/1974 | Abitboul | 427/130 |
| 3,900,653 | 8/1975 | Riboulet et al. | 428/409 |
| 3,967,025 | 6/1976 | Tanabe et al. | 428/155 |
| 3,983,285 | 9/1976 | Riboulet et al. | 428/212 |
| 4,071,654 | 1/1978 | Ogawa et al. | 428/900 |
| 4,135,031 | 1/1979 | Akashi et al. | 428/900 |
| 4,135,032 | 1/1979 | Akashi et al. | 428/900 |
| 4,146,031 | 3/1979 | Fujiyama et al. | 360/134 |
| 4,153,920 | 5/1979 | Shirahata et al. | 428/900 |
| 4,164,604 | 8/1979 | Tamai et al. | 428/900 |
| 4,198,458 | 4/1980 | Mitsuishi et al. | 428/212 |

FOREIGN PATENT DOCUMENTS

| | | | |
|---|---|---|---|
| 2501372 | 7/1976 | Fed. Rep. of Germany | 427/128 |
| 2807147 | 7/1978 | Fed. Rep. of Germany | 428/409 |
| 50-6765 | 3/1975 | Japan | 428/212 |
| 55-15770 | 4/1980 | Japan | 428/212 |

Primary Examiner—Alexander S. Thomas
Attorney, Agent, or Firm—Armstrong, Nikaido, Marmelstein & Kubovcik

[57] ABSTRACT

The present invention relates to a leader or trailer tape to be connected with a magnetic tape, which comprises a support base and two coating layers containing solid powders provided on the surface side and back side of the support base, the surface roughness of the one coating layer on the surface side being finer than that of the other coating layer on the back side, the surface roughness of the former being about 0.05 to 2 microns and that of the latter being about 0.5 microns or more.

14 Claims, No Drawings

LEADER OR TRAILER TAPE

BACKGROUND OF THE INVENTION

1. Field of the Invention

This invention relates to an improvement in a leader tape or trailer tape for a magnetic tape and more particularly, it is concerned with a leader tape or trailer tape for position finding of a magnetic tape loaded in a video cassette, cartridge, magazine and the like.

2. Description of the Prior Art

Up to the present time, as to a leader tape or trailer tape, there have been proposed various proposals, for example, comprising (1) providing a coating layer with a percent transmission of 20% or more and a surface electric resistance of $10^{12} \Omega$ or less on a support (Japanese Patent Publication No. 36044/1976), (2) providing a metallic vapor deposition film in the form of a stripe on the surface of a support (Japanese Utility Model Publication No. 14349/1971) and (3) matting by sand blast or chemical etching treatment of the one side or both sides of a support base (Japanese Utility Model Publication No. 42726/1974). However, the methods (1) and (3) still have the following disadvantages: (a) Drop-out are increased during repeated use and, in particular, the increase thereof is remarkable when the recording wavelength on a magnetic tape is short. (b) A magnetic head revolving at a high speed meets with clogging.

SUMMARY OF THE INVENTION

It is an object of the present invention to provide a leader or trailer tape for a magnetic tape.

It is another object of the present invention to provide an improved leader tape or trailer tape whereby the disadvantages of the prior art are overcome.

It is a further object of the present invention to provide a leader or trailer tape for a magnetic tape, whereby an increase of drop-out due to repeated use is suppressed and head clogging is decreased.

These objects can be attained by a leader or trailer tape to be connected with a magnetic tape, which comprises a support member and two coating layers containing solid powders, the surface roughness of the one coating layer on the surface side being further than that of the other coating layer on the back side, the surface roughness of the former being about 0.05 to 2 microns and that of the latter being about 0.5 micron or more.

DETAILED DESCRIPTION OF THE INVENTION

The inventors have hitherto made various efforts to provide a leader or trailer tape free from the foregoing problems and consequently, have found that the drop-out increased when a magnetic tape or the drop-out at the head part of a tape during repeated use is governed by the property of the leader and the increase of the drop-out is particularly remarkable where the width of a video track is narrow, i.e. 60 microns or less and the recording wavelength is short, i.e. 2 microns or less, although it has been considered that the drop-out at a magnetic tape part is a problem peculiar to the magnetic tape and is substantially independent on the leader tape. It is further found that this is not only a problem on the surface roughness of the leader on the surface side, but the surface roughness of the back side thereof is also important.

According to the result of our further studies, a leader or trailer tape with a decreased drop-out and decrease head clogging can be obtained by providing the surface side and back side of a support base with coating layers containing solid powders respectively so that the surface roughness of the one coating layer on the surface side is finer than that of the other coating layer on the back side, the surface roughness of the former being about 0.05 to 2 microns and the surface roughness of the latter being about 0.5 micron or more.

In the present invention, the surface roughness of a coating layer means "maximum height of irregularities" measured in accordance with JIS B 0601 (1976) and ASA B46-1 (1962) and the surface side of a support base corresponds to the magnetic layer of a magnetic tape to be connected therewith.

The coating layers provided on the both sides of a support member comprise each a resin as a binder and an extender (transparent white pigment) or a white pigment blended and dispersed therein and a white pigment is preferably used in the surface side layer only. The ratio of a pigment/resin is about 6/1 to 0.5/1, preferably 4/1 to 1/1. It is desirable that these pigments are relatively soft, that is, show a Mohs' hardness of 4 or less.

Useful examples of the above described extender are calcium carbonate ($CaCO_3$), talc powder ($3MgO.4SiO_2.H_2O$), magnesium silicate ($MgSiO_3$), barite ($BaSO_4+SiO_2+Fe_2O_3$), barium sulfate ($BaSO_4$), chalk ($CaCO_3$), clay ($Al_2O_3.2SiO_2.2H_2O$), a diatom earth ($SiO_2.nH_2O$), silica white ($SiO_2.nH_2O$), alumina white ($Al(OH)_3$), satin white ($3CaSO_4.2Al(OH)_3$), bentonite ($SiO_2+Al_2O_3$), calcium silicate ($CaSiO_3$), magnesium carbonate ($11MgCo_3.3Mg(OH)_2.11H_2O$), calcium plumbate ($CaPbO_4$), and aluminum silicate ($Al_4(SiO_4)_3.5H_2O$, $3Al_2O_3.2SiO_2$, $Al_2SiO_5$).

Useful examples of the above described white pigment are zinc oxide ($ZnO$), lithopone ($ZnS+BaSO_4$), zinc sulfide ($ZnS$), white lead ($2PbCO_3.Pb(OH)_2$), lead sulfate ($2PbSO_4.PbO$), zirconium oxide ($ZrO_2$), antimony white ($Sb_2O_3$), tin oxide ($SnO_2$), titanium oxide ($TiO_2$) and lead silicate ($PbO.nSiO_2$).

The surface roughness, i.e. degree of roughness is largely affected by the particle size of a pigment used. The particle size is about 0.02 to 10 microns, preferably 0.05 to 3 microns in the surface side layer and about 0.5 micron or more, preferably 0.7 to 10 microns in the back side layer. The surface roughness is about 0.05 to 2 microns, preferably 0.1 to 1.5 microns in the surface side layer and about 0.5 micron or more, preferably 0.5 to 5 microns in the back side layer. The thickness of the coating layer is about 0.5 micron or more, preferably 1 to 10 microns in the case of the surface side and about 2 microns or more, preferably 3 to 15 microns in the case of the back side. In addition, the surface electric resistance of the back side layer should be $10^{10} \Omega/sq$ or less.

As the above described resin there can be used thermoplastic resins, thermosetting resins and mixtures thereof, which are commonly used in magnetic recording layers.

Suitable thermoplastic resins are those which have a softening point of about 150° C. or lower, a mean molecular weight of about 10,000 to 200,000 and a degree of polymerization of the order of about 100 to 2,000, for example, vinyl chloride/vinyl acetate copolymers, vinyl chloride/vinylidene chloride copolymers, vinyl chloride/acrylonitrile copolymers, acrylate/acrylonitrile copolymers, acrylate/vinylidene chloride copolymers, acrylate/styrene copolymers, methacrylate/acrylonitrile copolymers, methacrylate/vinylidene chloride copolymers, methacrylate/styrene copolymers, urethane elastomers, polyvinyl fluoride, vinylidene chloride/acrylonitrile copolymers, butadiene/acrylonitrile copolymers, polyamide resins, polyvinyl butyral, cellulose derivatives such as cellulose acetate butyrate, cellulose diacetate, cellulose triacetate, cellulose propionate, cellulose nitrate and the like, styrene/butadiene copolymers, polyester resins, chlorovinyl ether/acrylate copolymers, amino resins, various synthetic rubber based thermoplastic resins and mixtures thereof. Examples of these resins are described in Japanese Patent Publication Nos. 6877/1962, 12528/1964, 19282/1964, 5349/1965, 20907/1965, 9463/1966, 14059/1966, 16985/1966, 6428/1967, 11621/1967, 4623/1968, 15206/1968, 2889/1969, 17947/1969, 18232/1969, 14020/1970, 14500/1970, 18573/1972, 22063/1972, 22064/1972, 22068/1972, 22069/1972, 22070/1972 and 27886/1973, U.S. Pat. Nos. 3,144,352, 3,419,420, 3,499,789 and 3,713,887.

Suitable thermosetting resins have a molecular weight of about 200,000 or less as a coating solution, and when heated after coating and drying, the molecular weight becomes infinity due to reactions such as condensation, addition and the like. Of these resins, preferred resins are those which do not soften or melt before the resin thermally decomposes. Typical examples of the thermosetting resin are phenol/formation novolak resins, phenol/formalin resol resins, phenol/-fulfural resins, xylene/formaldehyde resins, urea resins, melamine resins, drying oil-modified resins, phenolic resin-modified alkyd resins, maleic resin-modified alkyd resins, unsaturated polyester resins, epoxy resins and hardeners such as polyamines, acid anhydrides, polyamide resins and the like, isocyanate-terminated polyester resins of moisture hardening type, isocyanate-terminated polyether resins of moisture hardening type, polyisocyanate prepolymers (compounds having three or more isocyanate groups per one molecule obtained by reacting diisocyanates and low molecular weight triols, trimers and tetramers of diisocyanates), polyisocyanate prepolymers and active hydrogen-possessing resins (polyester polyols, polyether polyols, acrylate copolymers, maleate copolymers, 2-hydroxyethyl methacrylate copolymers, p-hydroxystyrene copolymers, etc.) and mixtures thereof. Examples of these resins are described in Japanese Patent Publication Nos. 8103/1964, 9779/1965, 7192/1966, 8016/1966, 14275/1966, 18179/1967, 12081/1968, 28023/1969, 14501/1967, 24902/1970, 13103/1971, 22065/1972, 22066/1972, 22067/1972, 22072/1972, 22073/1972, 28045/1972, 28048/1972, 28922/1972, and U.S. Pat. Nos. 3,144,353, 3,320,090, 3,437,510, 3,597,273, 3,781,210 and 3,781,211.

The support used in the present invention can be chosen from various plastics, for example, polyesters such as polyethylene terephthalate, polyethylene-2,6-naphthalate; cellulose derivatives such as cellulose triacetate, cellulose diacetate; vinyl resins such as polyvinyl chloride; polyolefins such as polypropylene and the like. The thickness of the support is generally about 4 to 200 microns, preferably 1 to 20 times as much as that of the base of a magnetic tape.

Between the above described coating layer and support, an undercoated layer can be provided. As a material for such an undercoated layer, there can be used amorphous linear polyesters, vinylidene chloride/acrylonitrile copolymers and the like, which are usually used in magnetic tapes. The thickness of the undercoated layer can optionally be chosen depending upon the thickness of a magnetic tape or leader or trailer tape, but preferably, it ranges from about 0.5 to 3 microns.

When using the leader or trailer tape according to the present invention, excellent advantages can be given such that the increase of drop-out due to repeated use is suppressed, head clogging is decreased, the coating layer on the back side having a rough surface serves to clean a tape transport system and dust adhesion to the leader is prevented. These advantages are particularly remarkable in the case of a small-sized video cassette assembly.

The tape of the present invention can be used as not only a leader or trailer tape for a magnetic tape, but also a tape for intermediate connection of timing tape.

The present invention will be explained in detail with reference to the following examples. It will be obvious to one skilled in the art that various changes and modifications can be made in the components, ratios, operational order and the like without departing from the spirit of the present invention. Therefore, the present invention should not be construed as being limited to the following examples.

EXAMPLES

A polyethylene terephthalate film base of 36 microns in thickness was provided with various coating layers, cut in a width of 12.6 mm (½ inch) to prepare leader tapes, used as a leader of a V-Cord cassette and subjected to various assessments to obtain results as shown in Table 1:

TABLE 1

| Example No. | Surface Coating Layer | | | Back Coating Layer | | | Drop-Out 20 μsec 18 dB | Head Clogging (50 pass) | Contamination of Tape Running System | Remark |
|---|---|---|---|---|---|---|---|---|---|---|
| | Thickness (μ) | Surface Roughness (μ) | Composition | Thickness (μ) | Surface Roughness (μ) | Composition | | | | |
| 1 | — | — | — | — | — | — | 400 | 5/50 | considerable | PET base only |
| 2 | 5 | 0.4 | MgSiO$_3$ | — | — | — | 150 | 1/50 | a little | — |
| 3 | " | " | " | 7 | 1.3 | Talc Powder | 50 | 0/50 | no | — |
| 4 | " | " | " | 8 | 1.8 | " | 37 | 0/50 | no | — |
| 5 | " | " | " | " | 2.9 | " | 35 | 0/50 | no | — |
| 6 | " | " | " | " | 3.0 | " | 30 | 0/50 | no | — |
| 7 | " | " | " | 3 | 0.6 | CaCO$_3$ | 56 | 0/50 | no | — |
| 8 | " | " | " | 10 | 4.5 | Talc Powder | 30 | 0/50 | no | — |
| 9 | 1 | 0.15 | ZnO | 7 | 1.5 | " | 42 | 0/50 | no | — |
| 10 | 3 | 0.27 | CaCo$_3$ | " | " | " | 40 | 0/50 | no | — |
| 11 | 10 | 1.4 | Talc Powder | " | " | " | 40 | 0/50 | no | — |
| 12 | " | 3.0 | " | " | 1.0 | CaCO$_3$ | 54 | 1/50 | no | chipping of video head |
| 13 | 5 | 0.4 | MgSiO$_3$ | " | 0.3 | " | 110 | 1/50 | a little | — |

TABLE 1-continued

| Example No. | Surface Coating Layer Thickness (μ) | Surface Coating Layer Surface Roughness (μ) | Surface Coating Layer Composition | Back Coating Layer Thickness (μ) | Back Coating Layer Surface Roughness (μ) | Back Coating Layer Composition | Drop-Out 20 μsec 18 dB | Head Clogging (50 pass) | Contamination of Tape Running System | Remark |
|---|---|---|---|---|---|---|---|---|---|---|
| 14 | " | 0.15 | ZnO | " | " | " | 120 | 2/50 | a little | — |
| 15 | 10 | 3.0 | Talc Powder | 10 | 5.0 | Talc Powder | 33 | 1/50 | no | chipping of video head |
| 16 | 5 | 0.05 | SiO$_2$ Powder | 3 | 0.5 | CaCo$_3$ | 65 | 0/50 | very little | — |

As evident from Table 1, Sample No. 2 of the prior art having a coating layer on one side only is superior to Sample No. 1 having no coating layer with respect to head clogging and drop out, but there is left a room for improvement. On the contrary, Sample Nos. 3 to 11 of the present invention are superior to Sample No. 2 of the prior art as to the following points:
(1) The drop-out after used 50 times is reduced to about ⅓.
(2) No head clogging takes place.
(3) No contamination of a tape running system takes place.

As apparent from these results, the coarser the surface roughness of the back side coating layer, the less the number of drop-out occurred. This is possibly due to that a tape transport system is cleaned by the back coating layer and scraping of the back coating layer is decreased. As to the surface coating layer, it is also found that the coarser the surface roughness, the less the number of drop-out occurred. However, when the surface roughness of the surface side coating layer is considerably coarse, i.e. 3 microns as in the case of Sample Nos. 12 and 15, chipping of a video head and head clogging take place irrespective of whether the surface roughness of the surface coating layer is finer or coarser than that of the back coating layer. When the surface roughness of the back coating layer is 0.5 micron or less as in the case of Sample Nos. 13 and 14, drop-out are increased and head clogging or contamination of a tape transport system takes place irrespective of whether the surface roughness of the surface coating layer is finer or coarser than that of the back coating layer.

What is claimed is:
1. A magnetic recording tape comprising a leader or trailer segment and a magnetic recording layer segment, the magnetic recording layer segment comprising a magnetic recording layer provided on a substrate and the leader or trailer segment comprising a support member having a coating layer provided on each of the surface and back sides of the support and not having a magnetic recording layer provided thereon; each coating layer comprising a binder and a powder, said powder being selected from the group consisting of extenders and white pigments, the surface roughness of the coating layer on the surface side of the support being finer than that of the coating layer on the back side of the support, the surface roughness of the former being 0.05 to 2 microns and the surface roughness of the latter being at least 0.5 micron.

2. The magnetic recording tape as claimed in claim 1, wherein said support member is of at least one material selected from the group consisting of polyesters, cellulose derivatives, vinyl resins and polyolefins.

3. The magnetic recording tape as claimed in claim 1 or 2, wherein said support member has a thickness of 4 to 200 microns.

4. The leader or trailer tape as claimed in claim 1, wherein said pigment has a Mohs' hardness of at most 4.

5. The magnetic recording tape as claimed in claim 1 or 4, wherein said extender is at least one material selected from the group consisting of calcium carbonate, magnesium silicate, barite, barium sulfate, clay, chalk, diatom earth, silica white, aluminum white, satin white, bentonite, calcium silicate, magnesium carbonate, calcium plumbate and aluminum silicate.

6. The magnetic recording tape as claimed in claim 1 or 4, wherein said white pigment is at least one material selected from the group consisting of zinc oxide, lithopone, zinc sulfide, white lead, lead sulfate, zirconium oxide, antimony white, tin oxide, titanium oxide and lead silicate.

7. The magnetic recording tape as claimed in claim 1 or 4, wherein said powder has a particle size of 0.02 to 10 microns in the coating layer on the surface side of said support member and of at least 0.5 micron in the coating layer on the back side of said support member.

8. The magnetic recording tape as claimed in claim 1, wherein the coating layer on the surface side of said support member has a thickness of at least 0.5 micron and the coating layer on the back side of said support member has a thickness of at least 2 microns.

9. The magnetic recording tape as claimed in claim 1, wherein the coating layer on the back side of said support member has a surface electric resistance of at most $10^{10}$ Ω/sq.

10. The magnetic recording tape as claimed in claim 1, wherein the binder for the powder is at least one material selected from the group consisting of thermoplastic resins and thermosetting resins.

11. The magnetic recording tape as claimed in claim 1 or 10, wherein the pigment/binder ratio is in the range of 6/1 to 0.5/1.

12. The magnetic recording tape as claimed in claim 1, wherein an undercoated layer is provided between said support member and a coating layer.

13. The magnetic recording tape as claimed in claim 1 or 12, wherein the undercoated layer is of at least one material selected from the group consisting of amorphous linear polyesters and vinylidine chloride/acrylonitrile copolymers.

14. The magnetic recording tape as claimed in any one of claims 1, 12 and 13, wherein the undercoated layer has a thickness of 0.5 to 3 microns.

* * * * *